US011718746B2

(12) United States Patent
Tomatsu et al.

(10) Patent No.: US 11,718,746 B2
(45) Date of Patent: *Aug. 8, 2023

(54) POLYOLEFIN-BASED RESIN FILM

(71) Applicant: TOYOBO CO., LTD., Osaka (JP)

(72) Inventors: Wakato Tomatsu, Inuyama (JP); Tadashi Nishi, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/955,008

(22) PCT Filed: Nov. 20, 2018

(86) PCT No.: PCT/JP2018/042800
§ 371 (c)(1),
(2) Date: Jun. 17, 2020

(87) PCT Pub. No.: WO2019/123944
PCT Pub. Date: Jun. 27, 2019

(65) Prior Publication Data
US 2020/0392327 A1  Dec. 17, 2020

(30) Foreign Application Priority Data
Dec. 22, 2017 (JP) ................. 2017-246669
Jul. 26, 2018 (JP) ................. 2018-140194

(51) Int. Cl.
B32B 27/08 (2006.01)
B32B 27/32 (2006.01)
B32B 27/34 (2006.01)
B32B 7/12 (2006.01)
B65D 65/40 (2006.01)
C08J 5/18 (2006.01)
C08L 53/00 (2006.01)

(52) U.S. Cl.
CPC .............. C08L 53/00 (2013.01); B32B 7/12 (2013.01); B32B 27/08 (2013.01); B32B 27/32 (2013.01); B32B 27/34 (2013.01); B65D 65/40 (2013.01); C08J 5/18 (2013.01); B32B 2307/31 (2013.01); B32B 2307/58 (2013.01); B32B 2307/582 (2013.01); B32B 2439/46 (2013.01); C08J 2323/16 (2013.01); C08J 2423/16 (2013.01)

(58) Field of Classification Search
CPC ....... B32B 27/32; B32B 7/12; B32B 2307/31; B32B 2307/58; B32B 2307/582; B32B 2439/70; C08J 5/18; C08J 2323/10; C08J 2323/14; C08J 2323/16; C08J 2423/10; C08J 2423/14; C08J 2423/16; C08L 23/14
USPC .............................. 428/34.1–36.92
See application file for complete search history.

(56) References Cited

U.S. PATENT DOCUMENTS

| | | | | |
|---|---|---|---|---|
| 6,060,137 A * | 5/2000 | Akao | ...................... | B32B 27/32 428/323 |
| 11,260,634 B2 | 3/2022 | Tomatsu et al. | | |
| 2010/0055429 A1 | 3/2010 | Lee et al. | | |
| 2012/0003412 A1* | 1/2012 | Yuno | ....................... | B32B 27/32 428/35.7 |
| 2012/0060997 A1* | 3/2012 | Mitchell | ................. | B32B 27/18 156/60 |
| 2012/0094042 A1* | 4/2012 | Lee | .......................... | C08L 23/10 428/35.7 |
| 2012/0251749 A1 | 10/2012 | Lee et al. | | |
| 2013/0115398 A1 | 5/2013 | Lu et al. | | |
| 2014/0272348 A1 | 9/2014 | Lee et al. | | |
| 2015/0028515 A1 | 1/2015 | Lee et al. | | |
| 2016/0197318 A1* | 7/2016 | Yamashita | ............. | C09J 123/12 429/185 |
| 2017/0203899 A1 | 7/2017 | Nakajima et al. | | |
| 2020/0156359 A1 | 5/2020 | Goto | | |
| 2021/0283889 A1 | 9/2021 | Tomatsu et al. | | |

FOREIGN PATENT DOCUMENTS

| | | |
|---|---|---|
| CN | 107310232 A | 11/2017 |
| EP | 3831599 A1 | 6/2021 |
| JP | 2000-143931 A | 5/2000 |
| JP | 2012-500307 A | 1/2012 |

(Continued)

OTHER PUBLICATIONS

European Patent Office, Extended European Search Report in European Patent Application No. 18891878.3 (dated Jul. 22, 2021).
Indian Patent Office, Examination Report in Indian Patent Application No. 202047028634 (dated Sep. 15, 2021).
Japanese Patent Office, International Search Report in International Patent Application No. PCT/JP2018/042800 (dated Feb. 19, 2019).
Japanese Patent Office, International Search Report in International Patent Application No. PCT/JP2019/027293 (dated Sep. 3, 2019).

(Continued)

Primary Examiner — Michael C Romanowski
(74) Attorney, Agent, or Firm — Leydig, Voit & Mayer, Ltd.

(57) ABSTRACT

A polyolefin-based resin film containing (a) 90 to 97 parts by weight of at least one polyolefin-based resin selected from a propylene-ethylene block copolymer and a propylene-α olefin random copolymer and (b) 3 to 10 parts by weight of an ethylene-propylene copolymer elastomer, wherein the propylene-α olefin random copolymer is present in an amount of 0 to 50% by weight relative to the total amount of the propylene-ethylene block copolymer and the propylene-α olefin random copolymer, and the polyolefin-based resin film has a thermal shrinkage ratio in a longitudinal direction of 3% or more and 20% or less, a thermal shrinkage ratio in a rectangular direction to a width direction of 1% or less, and a yield stress in the longitudinal direction of 150 MPa or more and 250 MPa or less.

10 Claims, No Drawings

(56) References Cited

FOREIGN PATENT DOCUMENTS

| JP | 2014-141302 | * | 8/2014 | ............. B32B 27/32 |
| JP | 2014-141302 A | | 8/2014 | |
| JP | 5790497 B2 | | 10/2015 | |
| JP | 2018-020844 A | | 2/2018 | |
| JP | 2018-058356 A | | 4/2018 | |
| JP | 2018-058358 A | | 4/2018 | |
| WO | WO 2013-066536 A1 | | 5/2013 | |
| WO | WO 2020/022060 A1 | | 1/2020 | |

OTHER PUBLICATIONS

Indian Patent Office, Hearing Notice in Indian Patent Application No. 202047028634 (dated Mar. 7, 2022).

European Patent Office, Extended European Search Report in European Patent Application No. 19841141.5 (dated Apr. 4, 2022).

China National Intellectual Property Administration, Office Action in Chinese Patent Application No. 201880081906.7 (dated Sep. 15, 2022).

U.S. Appl. No. 17/262,145, filed Jan. 21, 2021, Patented.

China National Intellectual Property Administration, First Office Action in Chinese Patent Application No. 201880081906.7 (dated May 7, 2022).

China National Intellectual Property Administration, First Office Action in Chinese Patent Application No. 201980049953.8 (dated May 16, 2022).

Intellectual Property India, Examination Report in Indian Patent Application No. 202147006580 (dated May 24, 2022).

China National Intellectual Property Administration, Office Action in Chinese Patent Application No. 201880081906.7 (dated Jan. 9, 2023).

Korean Intellectual Property Office, Office Action in Korean Patent Application No. 10-2020-7019553 (dated Apr. 17, 2023).

* cited by examiner

POLYOLEFIN-BASED RESIN FILM

CROSS-REFERENCE TO RELATED APPLICATIONS

This patent application is the U.S. national phase of International Patent Application No. PCT/JP2018/042800, filed Nov. 20, 2018, which claims the benefit of Japanese Patent Application No. 2017-246669, filed Dec. 22, 2017, and Japanese Patent Application No. 2018-140194, filed Jul. 26, 2018, which are incorporated by reference in their entireties herein.

TECHNICAL FIELD

The present invention relates to a polyolefin-based resin film. Further, the present invention relates to a polyolefin-based resin film suitable for heat sealing which includes a polyolefin-based resin film and at least one film selected from the group consisting of a polyamide resin film a polyester resin film, and a polypropylene resin film laminated on the polyolefin-based resin film.

BACKGROUND ART

A packaging bag is produced by thermocompression bonding (hereinafter, referred to as heat sealing) of the peripheral edges of a laminated body mainly including a base film such as a polyamide resin film, a polyester resin film, or a polypropylene resin film and a polyolefin-based resin film at a temperature close to the melting point of the polyolefin-based resin film in a state where the surfaces of the polyolefin-based resin film are in contact with each other.

As food packaging bags, so-called retort pouches suitable for long-term food storage are widely used. Such food packaging bags are sterilized by pressurized steam at about 130° C. after food is packed therein.

Demand for retort pouches has recently increased, and at the same time, retort pouches are required to have improved properties.

For example, such retort pouches are recently often packed in boxes during transportation before sold in stores, and are therefore required to be hard to break even when dropped in such a process, particularly even when dropped under refrigeration.

Further, when a food content is taken out of a packaging bag, particularly a retort pouch, the packaging bag is often torn with fingers from an incision that is so-called a notch made in the peripheral sealed portion of the packaging bag. However, when a conventional laminated body is used, there is a fear that a packaging bag cannot be torn in parallel with one edge of the packaging bag, usually in parallel with the horizontal direction and is therefore obliquely torn, or a phenomenon called "Nakiwakare" occurs in which the front-side laminated body and the back-side laminated body of a packaging bag are opposite in tearing direction in the vertical direction, and therefore it is difficult to take out a food content, a food content makes fingers or clothing dirty or fingers are burned when a food content has been heated.

The reason why it is difficult to tear the packaging bag in parallel with one edge of the packaging bag is that a base film used for the laminated body is distorted, that is, the molecular orientation axis direction of the base film is not parallel with one edge of the packaging body.

Such a problem does not occur if the molecular orientation axis direction of the base film can be made the same with the tearing direction of the packaging bag. The molecular orientation axis direction of the width wise center of a produced wide stretched film is coincident with the machine direction of the film, and therefore a resulting packaging bag can be torn in parallel with one edge of the packaging bag. However, the molecular orientation axis direction of the widthwise end of the film is inclined, and therefore the tearing direction of a resulting packaging bag is inclined. It is practically impossible to completely avoid the procurement of a base film using the widthwise end of film. In addition, the degree of distortion tends to be larger than ever before due to an increase in the production speed or width of a base film.

Therefore, attempts have been made to solve such a problem by devising a polyolefin-based resin film to be laminated on a base film.

Patent Document 1 discloses a film obtained by uniaxially stretching a polyolefin-based resin sheet containing an ethylene-propylene block copolymer and an ethylene propylene random copolymer 3.0 times or less (see, for example, Patent Document 1). Patent Document 1 states that straight cuttability can be achieved by laminating this film on a base film, but there is a room for improvement in tear strength and there is a problem that a phenomenon called "Nakiwakare" is likely to occur.

Patent Document 2 or Patent Document 3 discloses a film obtained by uniaxially stretching a polyolefin-based resin sheet containing a propylene ethylene block copolymer or a propylene-ethylene random copolymer and a propylene-butene elastomer and/or an ethylene-butene elastomer about 5 times. However, there is a room for improvement in bag breaking due to dropping, and there is a problem that bag-breaking resistance is poor at a temperature lower than a service temperature assumed in Patent Document 3.

PRIOR ART DOCUMENTS

Patent Documents

Patent Document 1: Japanese Patent No. 5790497
Patent Document 2: JP-T-2012-500307
Patent Document 3: JP-A-2014-141302

SUMMARY OF THE INVENTION

Problem to be Solved by the Invention

It is an object of the present invention to provide a polyolefin-based resin film such that a packaging bag obtained from a laminated body has excellent, straight cuttability and is less likely to break due to dropping even when the laminated body is obtained by laminating the polyolefin-based resin film on a base film whose molecular orientation axis is greatly distorted, such as a biaxially-stretched polyamide-based resin film.

Solution to the Problem

The present inventor has intensively studied to achieve the above object, and as a result has found that a polyolefin-based resin film such that a packaging bag obtained from a laminated body has excellent straight cuttability and is less likely to break due to dropping even when the laminated body is obtained by laminating the polyolefin-based resin film on a base film whose molecular orientation axis is greatly distorted, such as a biaxially-stretched polyamide-based resin film can be obtained by using, as an impact absorber, an ethylene-propylene copolymer elastomer excellent, in compatibility with a polyolefin-based resin as a main component of the film, reducing thermal shrinkage ratios in a longitudinal direction and a width direction while orienting a polymer molecule mainly in the longitudinal direction by stretching, and allowing a yield stress in the longitudinal direction to fall within a certain range. This finding has led to the completion of the present invention.

More specifically, the present invention includes the following aspects.

[1] A polyolefin-based resin film comprising: 90 to 97 parts by weight of at least one polyolefin-based resin selected from the group consisting of a propylene-ethylene block copolymer and a propylene-α olefin random copolymer; and 3 to 10 parts by weight of an ethylene-propylene copolymer elastomer, wherein a ratio of the propylene-α olefin random copolymer to a total amount of the propylene-ethylene block copolymer and the propylene-α olefin random copolymer is in a range of 0 to 50% by weight, and the polyolefin-based resin film has a thermal shrinkage ratio in a longitudinal direction of 3% or more and 20% or less, a thermal shrinkage ratio in a rectangular direction to a width direction of 0.1% or less, and a yield stress in the longitudinal direction of 150 MPa or more and 250 MPa or less.

The longitudinal direction herein means a direction in which the film travels in a film production process, and the width direction herein means a rectangular direction to the longitudinal direction.

[2] A laminated body comprising: the polyolefin-based resin film according to the above [1]; and at least one film selected from the group consisting of a polyamide resin film, a polyester resin film, and a polypropylene resin film.

[3] The laminated body according to the above [2], which has a straight cuttability of 5 mm or less.

[4] A packaging body comprising the laminated body according to the above [3].

[5] The packaging body according to the above [4], which is used for retort applications.

Effect of the Invention

The polyolefin-based resin film according to the present invention has excellent bag-breaking resistance, does not cause a phenomenon called "Nakiwakare", and is particularly suitable for retort pouches.

MODE FOR CARRYING OUT THE INVENTION

Hereinbelow, the present invention will be described in detail.

A polyolefin-based resin film according to the present invention contains an ethylene-propylene copolymer elastomer and a propylene-ethylene block copolymer or a mixture of a propylene-ethylene block copolymer and at least one propylene-α olefin random copolymer and therefore has a sea-island structure, which makes it possible to develop excellent bag-breaking resistance.

A sea portion includes a portion mainly containing propylene of the propylene-ethylene block copolymer and further containing the propylene-α olefin random copolymer, and an island portion includes a portion mainly containing the ethylene-propylene copolymer elastomer and ethylene of the propylene-ethylene block copolymer.

(Propylene-Ethylene Block Copolymer)

In the present invention, a propylene-ethylene block copolymer can be used. The propylene-ethylene block copolymer used in the present invention is a multi-stage copolymer obtained through a first-stage polymerization step in which a copolymer component containing a large amount of propylene and a small amount of ethylene is obtained and a second-stage polymerization step in which a copolymer component containing a small amount of propylene and a large amount of ethylene is obtained. More specifically, a propylene ethylene block copolymer obtained by gas-phase polymerization is preferably used as shown in JP A-2000-186159. That is, the multi stage copolymer may be a block copolymer obtained by forming a polymer portion (component A) mainly containing propylene by polymerization in the presence of substantially no inert solvent in a first step and then forming a propylene-ethylene copolymer portion (component B) having an ethylene content, of 20 to 50 parts by weight by polymerization in a gas phase in a second step, but is not limited thereto.

A melt flow rate (MFR) of the propylene-ethylene block copolymer (as measured at 230° C. and a load of 2.16 kg) is not particularly limited, but is preferably 1 to 10 g/10 min, more preferably 2 to 7 g/10 min. If the melt flow rate is less than 1 g/10 min, extrusion through a T-die is difficult due to too high a viscosity. On the other hand, if the melt flow rate exceeds 10 g/10 min, a problem that the film is sticky or has poor impact strength arises.

In the present invention, a portion soluble in xylene at 20° C. is called CXS, and a portion insoluble in xylene at 20° C. is called CXIS. In the propylene ethylene block copolymer used in the present invention, CXS mainly contains a rubber component (component B) and CXIS mainly contains a polypropylene component (component A). When the limiting viscosity of CXS and the limiting viscosity of CXIS are defined as $[\eta]CXS$ and $[\eta]CXIS$, respectively, the value of $[\eta]CXS$ and the value of $[\eta]CXIS$ are not particularly limited, but $[\eta]CXS$ is preferably in the range of 1.8 to 3.8 dl/g, more preferably in the range of 2.0 to 3.0 di/g. If $[\eta]CXS$ exceeds 3.0 dl/g, fish eyes are likely to occur in the polyolefin-based resin film. On the other hand, if $[\eta]CXS$ is 1.8 dl/g or less, there is a case where heat-seal strength when two sheets of the polyolefin based resin film are heat-sealed is significantly reduced. On the other hand, $[\eta]CXIS$ is preferably in the range of 1.0 to 3.0 dl/g. If $[\eta]CXIS$ exceeds 3.0 dl/g, there is a case where extrusion through a T-die is difficult due to too high a viscosity. On the other hand, if $[\eta]CXIS$ is less than 1.0 dg/l, a problem that the film is sticky or has poor impact strength may arise.

The above-described $[\eta]CXS$ and $[\eta]CXIS$ are values measured by the following measurement method. First, 5 g of a sample is completely dissolved in 500 mL of boiling xylene, and then the temperature of the resulting solution is decreased to 20° C., and the solution is allowed to stand for 4 hours or more. Then, the solution is separated into a filtrate and a precipitate by filtration, and the limiting viscosity ($[\eta]$) of a component (CXS) obtained by drying and solidifying so the filtrate and the limiting viscosity $[\eta]$ of a solid (CXIS) obtained by drying the precipitate at 70° C. under reduced pressure are measured in tetralin at 135° C. using an Ubbelohde-type viscometer.

It is generally known that MFR and the limiting viscosity η of an overall film correlate with each other. The MFR of a resin used can approximately be known by knowing η of a film, n gives an indication of molecular weight, and a larger value of η indicates a larger molecular weight, and a smaller value of η indicates a smaller molecular weight. MFR gives an indication of molecular weight, and a smaller value of MFR indicates a larger molecular weight, and a larger value of MFR indicates a smaller molecular weight.

The copolymerization ratio of an ethylene component in the propylene-ethylene block copolymer is preferably 1 to 15% by weight, preferably 3 to 10% by weight. The copolymerization ratio of a propylene component in the propylene-ethylene block copolymer is preferably 85 to 99% by weight, preferably 90 to 97% by weight.

Specific examples of the propylene-ethylene block copolymer include a block copolymerized polypropylene resin having an ethylene content of 6.5% by mass, a propylene content of 93.5% by weight, and a limiting viscosity η of CXS of 2.5 dl/g (MFR at 230.0 and a load of 2.16 kg: 3.0 g/10 min, WFS5293-22 manufactured by SUMITOMO CHEMICAL COMPANY, LIMITED) and a block copolymerized polypropylene resin having an ethylene content of 5.7% by mass, a propylene content of 94.3% by weight, and a limiting viscosity η of CXS of 2.3 dl/g (MFR at 230° C. and a load of 2.16 kg: 3.0 g/10 min, WFS5293-29 manufactured by SUMITOMO CHEMICAL COMPANY, LIMITED).

(Propylene-α Olefin Random Copolymer)

In the present invention, a propylene-α olefin random copolymer may be added for the purpose of decreasing the heat-seal temperature of the polyolefin-based resin film.

Examples of the propylene-α olefin random copolymer include copolymers of propylene and at least one C2 to C20 α-olefin other than propylene. Examples of the C2 to C20 α-olefin monomer to be used include ethylene, butene-1, pentene-1,4-methyl-pentene-1, hexene-1, and octene-1. The C2 to C20 α-olefin monomer is not particularly limited, but is preferably ethylene in terms of compatibility with the propylene-ethylene block copolymer. Further, the C2 to C20 α-olefin monomer is not particularly limited as long as at least one C2 to C20 α-olefin monomer is used, and if necessary, two or more C2 to C20 α-olefin monomers may be used in combination. The propylene α-olefin random copolymer is particularly preferably a propylene-ethylene random copolymer.

The lower limit of melt flow rate (MFR) of the propylene-α olefin random copolymer at 230° C. and a load of 2.16 kg is not particularly limited, but is preferably 0.6 g/10 min, more preferably 1.0 g/10 min, even more preferably 1.2 g/10 min. If the MFR is less than the above lower limit, there is a case where compatibility with the propylene-ethylene block copolymer is poor so that blushing of the film occurs. The upper limit of melt flow rate of the propylene-α olefin random copolymer is not particularly limited, but is preferably 8.0 g/10 min, more preferably 7.0 g/10 min. even more preferably 5.0 g/10 min. A specific example of the propylene-α olefin random copolymer includes S131 manufactured by SUMITOMO CHEMICAL COMPANY, LIMITED (density: 890 kg/m³, MFR at 230° C. and a load of 2.16 kg: 1.5 g/10 min, melting point: 132° C.).

The lower limit of melting point of the propylene-α olefin random copolymer is not particularly limited, but is preferably 120° C., more preferably 125° C. If the melting point is less than the above lower limit, there is a case where heal resistance is impaired so that the inner surfaces of a bag are fused together when the bag is subjected to retort treatment. The upper limit of melting point of the propylene-α olefin random copolymer is not particularly limited, but is preferably 145° C., more preferably 140° C. If the melting point is more than the above upper limit, there is a case where the effect of decreasing the seal temperature is small.

(Ethylene-Propylene Copolymer Elastomer)

In the present invention, an ethylene-propylene copolymer elastomer is used as one raw material component of the polyolefin-based resin film according to the present invention for the purpose of enhancing the resistance to bag breaking due to dropping of a packaging bag according to the present invention.

The ethylene-propylene copolymer elastomer is an amorphous or low-crystallinity copolymerized polymer obtained by copolymerization of ethylene and propylene and exhibiting rubber-like elasticity at around ordinary temperature.

The ethylene-propylene copolymer elastomer used in the present invention is not particularly limited, but preferably has a melt flow rate (MFR) at 230° C. and a load of 2.16 kg of 0.2 to 5 g/10 min, a density of 820 to 930 kg/m³, and a molecular weight distribution (Mw/Mn) determined by GPC of 1.3 to 6.0.

If the melt flow rate (MFR) of the ethylene-propylene copolymer elastomer used in the present invention at 230° C. and a load of 2.16 kg is less than 0.2 g/10 min, fish eyes are likely to occur due to insufficient uniformity of kneading, and a melt flow rate exceeding 5 g/min is not preferred in terms of bag-breaking resistance.

The limiting viscosity [η] of the ethylene-propylene copolymer elastomer used in the present invention is preferably 1.0 to 5.0, preferably 1.2 to 3.0 in terms of maintaining heat-seal strength and impact strength and bag drop impact strength. If the limiting viscosity [η] is less than 1.0, fish eyes are likely to occur due to insufficient uniformity of kneading, and a limiting viscosity [η] exceeding 5.0 is not preferred in terms of bag-breaking resistance and heat-seal strength.

The copolymerization ratio of a propylene component in the ethylene-propylene copolymer elastomer used in the present invention is preferably 15 to 45% by weight, preferably 20 to 40% by weight. The copolymerization ratio of an ethylene propylene component in the ethylene-propylene copolymer elastomer is preferably 55 to 85% by weight, preferably 60 to 80% by weight.

A specific example of the ethylene-propylene copolymer elastomer includes an ethylene-propylene copolymer elastomer (TAFMER P0480 manufactured by Mitsui Chemicals, Inc.) having a density of 870 kg/m³, a MFR (230° C., 2.16 kg) of 1.8 g/10 min, and a propylene content of 93.5% by mass.

(Polyolefin-Based Resin Film)

The polyolefin-based resin film according to the present invention contains 3 to 10 parts by weight of an ethylene-propylene copolymer and 90 to 97 parts by weight of at least one polyolefin-based resin selected from the group consisting of a propylene-ethylene block copolymer and a propylene-α olefin random copolymer. When their containing amounts are within the above ranges, resistance to bag breaking due to dropping, the finished quality of a bag, and tear strength are excellent, and a phenomenon called "Nakiwakare" is small.

Here, the total amount of at least one polyolefin-based resin selected from the group consisting of a propylene-ethylene block copolymer and a propylene-α olefin random copolymer and an ethylene-propylene copolymer is taken as 100 parts by weight.

The polyolefin-based resin film according to the present invention preferably contains 3 to 8 parts by weight of an ethylene-propylene copolymer and 92 to 97 parts by weight of at least one polyolefin-based resin selected from the group consisting of a propylene-ethylene block copolymer and a propylene-α olefin random copolymer, and more preferably contains 3 to 8 parts by weight of an ethylene-propylene copolymer and 92 to 98 parts by weight of at least one polyolefin based resin selected from the group consisting of a propylene ethylene block copolymer and a propylene-α olefin random copolymer.

The propylene-α olefin random copolymer is particularly preferably a propylene-ethylene random copolymer.

In the polyolefin-based resin film according to the present invention, the ratio of the propylene-α olefin random copolymer to the total amount of the propylene-ethylene block copolymer and the propylene-α olefin random copolymer may be in the range of 0 to 50% by weight. If the ratio of the propylene-α olefin random copolymer exceeds 50% by weight, there is a case where resistance to bag breaking due to dropping deteriorates, or tear strength increases and a phenomenon called "Nakiwakare" is large. The ratio of the propylene-α olefin random copolymer is preferably 40% by weight or less, more preferably 35% by weight or less.

In terms of resistance to bag breaking due to dropping or heat-seal strength, the ratio of the propylene-α olefin random copolymer is preferably 10% by weight or more, more preferably 20% by weight or more.

(Additive)

The polyolefin based resin film according to the present invention may contain an anti blocking agent. The anti-blocking agent to be added is not particularly limited, and examples thereof include inorganic particles such as calcium carbonate, silicon dioxide, titanium dioxide, barium sulfate, magnesium oxide, talc, and zeolite and organic particles made of an acrylic, styrene-based, or styrene-butadiene-based polymer or a cross-linked product of such a polymer. In consideration of controllability of particle size distribution, dispersibility, ease of maintaining optical appearance, and prevention of dropping off of particles from the film, organic particles made of a cross linked product are preferred. Particularly, the cross-linked product is preferably a cross-linked acrylic polymer made of an acrylic monomer such as acrylic acid, methacrylic acid, an acrylic acid ester, or a methacrylic acid ester, and cross-linked polymethyl methacrylate is more preferably recommended. The surfaces of these particles may be coated with various materials for the purpose of improving dispersibility or preventing dropping off of particles. These particles may have an indefinite shape, a spherical shape, an oval spherical shape, a rod-like shape, a horn-like shape, a polyhedral shape, or a conical shape, and further may be porous particles having pores in surfaces and inside thereof. The anti-blocking agent preferably has an average particle diameter of 3 to 12 μm in terms of film appearance and blocking resistance. The use of only one kind of anti-blocking agent is effective, but there is a case where a higher anti-blocking effect can be obtained by mixing two or more kinds of inorganic particles different in particle diameter or shape because more complicated projections are formed on the surface of the film. When a block copolymer is used as a main constituent resin, there is a case where surface irregularities are formed by dispersion of the polymer, and therefore a high anti-blocking effect can be obtained without adding the anti-blocking agent.

The polyolefin-based resin film according to the present invention may contain an organic lubricant. This makes it possible to improve the lubricity of a laminated film or the effect of preventing blocking, thereby improving handleability of the film. The reason for this is considered to be that the organic lubricant is present on the surface of the film due to bleeding out, and therefore a lubricating effect or a releasing effect is developed. Further, the organic lubricant to be added preferably has a melting point equal to or more than ordinary temperature. Preferred examples of the organic lubricant include fatty acid amides and fatty acid esters. More specific examples thereof include oleic amide, erucic amide, behenic amide, ethylene bisoleic amide, hexamethylene bisoleic amide, and ethylene bisoleic amide. These organic lubricants may be used singly, but are preferably used in combination of two or more of them because there is a case where lubricity and the effect of preventing blocking can be maintained even in more severe environments.

If necessary, the polyolefin-based resin film according to the present invention may contain appropriate amounts of an antioxidant, an antistatic agent, an anti fogging agent, a neutralizer, a nucleating agent, a colorant, other additives, an inorganic filler etc. without interfering with the achievement of the object of the present invention. As the antioxidant, a phenol based antioxidant and a phosphite-based antioxidant may be used singly or in combination, or an antioxidant having the skeleton of a phenol-based antioxidant and the skeleton of a phosphite-based antioxidant in one molecule may be used singly.

(Polyolefin Based Resin Film Having Two or More Layers)

The polyolefin based resin film according to the present invention may have a single layer or two or more layers. For example, the polyolefin-based resin film according to the present invention may have a three-layer structure including a sealing layer, an intermediate layer, and a lamination layer, in which case pellets made of the recycled film may be added to the intermediate layer to reduce heat-seal energy or to reduce cost without impairing hag-breaking resistance, or the propylene α-olefin random copolymer may be added only to the sealing layer and the intermediate layer and the lamination layer may mainly contain the propylene-ethylene block copolymer to prevent a reduction in impact resistance. When the polyolefin-based resin film according to the present invention has two or more layers, each of the layers preferably has the compositional ratio described in the above [1].

(Method for Producing Polyolefin-Based Resin Film)

As a method for forming the polyolefin-based resin film according to the present invention, for example, an inflation method or a T-die method may be used. However, a T-die method is preferred from the viewpoint of enhancing transparency or ease of drafting. An inflation method uses air as a cooling medium, but a T-die method uses a cooling roll, and is therefore a production method advantageous for increasing the cooling speed of an unstretched sheet. By increasing the cooling speed, crystallization of an unstretched sheet can be prevented, which is advantageous in that high transparency can be achieved and the burden of stretching in a subsequent process can easily be controlled. For these reasons, the polyolefin-based resin film according to the present invention is more preferably formed by a T-die method.

The lower limit of temperature of the cooling roll at the time when a melted raw material resin is cast to obtain a non-oriented sheet is not particularly limited, but is preferably 15° C., more preferably 20° C. If the temperature of the cooling roll is less than the above lower limit, there is a case where the contact between an unstretched sheet and the cooling roll is poor due to the occurrence of condensation on the cooling roll, which causes a thickness defect. The upper limit of temperature of the cooling roll is not particularly limited, but is preferably 50° C., more preferably 40° C. If the temperature of the cooling roll exceeds the above upper limit, there is a case where the transparency of the polyolefin-based resin film deteriorates.

A method for stretching a non-oriented sheet is not particularly limited, but for example, an inflation method or a roll stretching method may be used. However, a roll stretching method is preferred in terms of orientation controllability.

By stretching a non oriented sheet in a longitudinal direction under appropriate conditions, straight cuttability is developed. This is because molecular chains are regularly arranged in a stretch direction. In the present invention, a direction in which the film travels in a film production process is referred to as a longitudinal direction, and a rectangular direction to the longitudinal direction is referred to as a width direction.

The lower limit of a stretch ratio in the longitudinal direction is not particularly limited, but is preferably 3.3 times. If the stretch ratio in the longitudinal direction is less than the above lower limit, there is a case where yield stress reduces so that tear strength in the longitudinal direction increases or straight cuttability is poor. The lower limit of the stretch ratio in the longitudinal direction is more preferably 3.5 times, even more preferably 3.8 times.

The upper limit of the stretch ratio in the longitudinal direction is not particularly limited, but is preferably 5.5 times. If the stretch ratio in the longitudinal direction is more than the above upper limit, there is a case where orientation excessively proceeds so that resistance to bag breaking due to dropping deteriorates due to a reduction in seal energy. The upper limit of the stretch ratio in the longitudinal direction is more preferably 5.0 times.

The lower limit of a roll temperature during stretching in the longitudinal direction is not particularly limited, but is preferably 80° C. If the roll temperature is less than the above lower limit, there is a case where stretch stress applied to the film increases so that the thickness of the film varies. The lower limit of the roll temperature is more preferably 90° C.

The upper limit of the stretch roll temperature is not particularly limited, but is preferably 140° C. If the stretch roll temperature exceeds the above upper limit, there is a case where stretch stress applied to the film reduces so that the tear strength of the film reduces, and in addition, the film is fused to the stretch roll, which makes production difficult. The upper limit of the stretch roll temperature is more preferably 130° C., even more preferably 125° C., particularly preferably 115° C.

It is preferred that before the unstretched sheet is subjected to a stretching process, the temperature of the sheet is increased by contact with a pre-heating roll.

The lower limit of temperature of the pre-heating roll at the time when the non oriented sheet is stretched is not particularly limited, hut is preferably 80° C., more preferably 90° C. If the temperature of the pre-heating roll is less than the above lower limit, there is a case where stretch stress increases so that thickness variation occurs. The upper limit of temperature of the pre-heating roll is not particularly limited, but is preferably 140° C., more preferably 130° C., even more preferably 125° C. If the temperature of the pre heating roll is more than the above upper limit, there is a case where a thermal shrinkage ratio or a shrinkage ratio during retorting increases. This is because thermal crystallization before stretching can be prevented to reduce a residual stress after stretching.

The polyolefin-based resin film subjected to the stretching process is preferably subjected to heating treatment for promoting crystallization (hereinafter, referred to as annealing treatment) to prevent thermal shrinkage. Examples of a method for annealing treatment include a roll heating method and a tenter method, but a roll heating method is preferred in terms of simplicity of equipment or ease of maintenance. By reducing the internal stress of the film by performing annealing treatment, thermal shrinkage of the film can be prevented, and easy tearability can further be improved. Since easy tearability can further be improved by annealing treatment, it is not necessary to increase the stretch ratio to improve tearability unlike a conventional method, and therefore a shrinkage ratio during retorting and heat seal strength after retorting are not sacrificed. More specifically, tear strength is reduced, and therefore a phenomenon called "Nakiwakare" is less likely to occur during tearing after bag making even when straight cuttability of the polyolefin-based resin film itself is the same.

The lower limit of temperature of annealing treatment is not particularly limited, but is preferably 80° C. If the temperature of annealing treatment is less than the above lower limit, there is a case where a thermal shrinkage ratio increases so that the finished quality of a packaging bag after bag making or retorting deteriorates or tear strength increases. The lower limit of temperature of annealing treatment is more preferably 100° C., particularly preferably 110° C.

The upper limit of temperature of annealing treatment is not particularly limited, but is preferably 140° C. When the temperature of annealing treatment is higher, a thermal shrinkage ratio is more likely to reduce. However, if the temperature of annealing treatment exceeds the above upper limit, there is a case where the thickness of the film varies or the film is fused to production equipment. The upper limit of temperature of annealing treatment is more preferably 135° C., particularly preferably 130° C.

In the present invention, the lamination surface of the polyolefin-based resin film described above is preferably subjected to surface activation by corona treatment or the like. This improves the strength of lamination between the polyolefin-based resin film and a base film.

(Properties of Polyolefin-Based Resin Film)
(Film Thickness)

The thickness of the polyolefin-based resin film according to the present invention is not particularly limited, but the lower limit of the thickness is preferably 10 µm, more preferably 30 µm, even more preferably 40 µm, particularly preferably 50 µm. If the thickness is less than the above lower limit, the polyolefin-based resin film is relatively thinner than a base film, and therefore there is a case where straight cuttability of a laminated body deteriorates, the film is difficult to process due to too low resilience, or bag-breaking resistance deteriorates due to a reduction in impact resistance. The upper limit of thickness of the film is preferably 200 µm, more preferably 130 µm, preferably 100 µmm, particularly preferably 80 µm. If the thickness of the film exceeds the above upper limit, there is a case where the film is difficult to process due to too high resilience or an appropriate packaging body is difficult to produce.

(Thermal Shrinkage Ratio)

The upper limit of thermal shrinkage ratio of the polyolefin based resin film according to the present invention in the longitudinal direction at 120° C. is 20%. If the thermal shrinkage ratio in the longitudinal direction exceeds the above upper limit, there is a case where tear strength increases, and the appearance of a packaging body is impaired due to large shrinkage during heat sealing or during retorting of the packaging body. The upper limit of the thermal shrinkage ratio in the longitudinal direction is preferably 17%, more preferably 14%.

The lower limit of thermal shrinkage ratio of the polyolefin-based resin film according to the present invention in the longitudinal direction is 2%. In order to achieve a thermal shrinkage ratio of less than 2%, it is necessary to significantly increase annealing temperature or annealing time, and therefore bag-breaking resistance or appearance significantly deteriorates.

The upper limit of thermal shrinkage ratio of the polyolefin-based resin film according to the present invention in the width direction is 1%. If the thermal shrinkage ratio in the width direction exceeds the above upper limit, tear strength in the longitudinal direction increases or straight cuttability is poor. The upper limit of the thermal shrinkage ratio in the width direction is preferably 0.5%. The lower limit of thermal shrinkage ratio of the polyolefin-based resin film according to the present invention in the width direction is −5%. If the thermal shrinkage ratio in the width direction is less than the above lower limit, there is a case where elongation occurs during heat sealing so that the appearance of a packaging body deteriorates. The lower limit of the thermal shrinkage ratio in the width direction is preferably −2%.

(Yield Stress)

The yield stress of the polyolefin-based resin film according to the present invention in the longitudinal direction needs to be 150 MPa or more. If the yield stress in the longitudinal direction is less than 150 MPa, straight cuttability in the longitudinal direction is poor. The yield stress in the longitudinal direction is more preferably 100 MPa or more, even more preferably 170 MPa or more.

The yield stress of the polyolefin-based resin film according to the present invention in the longitudinal direction needs to be 250 MPa or less. If the yield stress in the longitudinal direction is more than 250 MPa, there is a case where the seal energy of the film reduces so that bag-breaking resistance deteriorates. The yield stress in the longitudinal direction is more preferably 240 MPa or less, even more preferably 200 MPa or less.

The yield stress of the polyolefin based resin film according to the present invention in the width direction is preferably 50 MPa or less. The yield stress in the width direction is more preferably 40 MPa or less, even more preferably 30 MPa or less.

The longitudinal direction is preferably a stretch direction in the process of stretching an unstretched sheet. The width direction is preferably a rectangular direction to the stretch direction in the process of stretching an unstretched sheet.

Further, the ratio between the yield stress in the longitudinal direction and the yield stress in the width direction of the polyolefin-based resin film according to the present invention is not particularly limited, but is preferably 4.0 or more, more preferably 6.0 or more. When the ratio between the yield stress in the longitudinal direction and the yield stress in the width direction is 4.0 or more, orientation in the longitudinal direction is not insufficient, and therefore straight cuttability is likely to improve.

Further, the ratio between the yield stress in the longitudinal direction and the yield stress in the width direction is not particularly limited, but is preferably 14.0 or less, more preferably 12.0 or less. When the ratio between the yield stress in the longitudinal direction and the yield stress in the width direction is 14.0 or less, orientation in the longitudinal direction is not excessive and appropriate hear-seal strength is achieved, and therefore bag-breaking resistance is likely to improve.

(Tear Strength)

The upper limit of tear strength of the polyolefin based resin film according to the present invention in the longitudinal direction is not particularly limited, but is preferably 0.2 N. If the teat strength in the longitudinal direction exceeds the above upper limit, there is a case where a laminated film is difficult to tear. The upper limit of the tear strength in the longitudinal direction is more preferably 0.16 N.

The lower limit of tear strength of the polyolefin-based resin film according to the present invention in the width direction is not particularly limited, but is preferably 0.02 N. If the tear strength in the width direction is less than the above lower limit, there is a case where bag-breaking resistance deteriorates. The lower limit of the tear strength in the width direction is more preferably 0.03 N.

(Wetting Tension)

The lower limit of wetting tension of the surface of the polyolefin-based resin film according to the present invention to be laminated on at least one film selected from the group consisting of a polyamide resin film, a polyester resin film, and a polypropylene resin film is not particularly limited, but is preferably 30 mN/m, more preferably 35 mN/m. If the wetting tension is less than the above lower limit, there is a case where lamination strength reduces. The upper limit of the wetting tension is not particularly limited, but is preferably 55 mN/m, more preferably 50 mN/m. If the wetting tension exceeds the above upper limit, there is a case where blocking occurs in the roll of the polyolefin-based resin film.

(Piercing Strength)

The lower limit of piercing strength of the polyolefin-based resin film according to the present invention is not particularly limited, but is preferably 0.13 N/μm, more preferably 0.15 N/μm. If the piercing strength is less than the above lower limit, there is a case where a pin hole is formed when a projection hits a packaging body. The upper limit of the piercing strength is not particularly limited, but is preferably 0.40 N/μm, more preferably 0.30 N/μm. If the piercing strength exceeds the above upper limit, there is a case where handling of the film or a laminated body using the film is difficult due to too high resilience.

(Structure and Production Method of Laminated Body)

A laminated body using the polyolefin based resin film according to the present invention is obtained by laminating the polyolefin-based resin film used as a sealant on at least one film base material selected from the group consisting of a polyamide resin film, a polyester resin film, and a polypropylene resin film. The film base material is preferably a biaxially-stretched polyamide, polyester, or polypropylene resin film in terms of strength. Further, by a known technique, for the purpose of imparting adhesiveness or barrier properties, the base film may be subjected to coating or vapor deposition, or aluminum foil may further be laminated on the base film.

More specifically, the laminated film may have a structure such as biaxially stretched PET film/aluminum foil/sealant, biaxially-stretched PET film/biaxially-stretched nylon film/sealant, biaxially stretched nylon film/sealant, biaxially-stretched polypropylene film/sealant, or biaxially-stretched PET film/biaxially-stretched nylon film/aluminum foil/sealant.

Among them, when a biaxially-stretched nylon film is laminated on a conventional sealant, the straight cuttability of a resulting laminated body is significantly poor. When the polyolefin-based resin film according to the present invention is used as a sealant, a laminated body having excellent straight cuttability can be produced whichever of the structures is selected.

A lamination method to be used may be a conventional method such as a dry lamination method or an extrusion lamination method, and a laminated body having excellent straight cuttability can be produced whichever of the lamination methods is used.

(Properties of Laminated Body)
(Tear Strength)

The upper limit of tear strength of the laminated body according to the present invention in a direction in which the thermal shrinkage ratio is larger is not particularly limited, but is preferably 0.4 N. If the teat strength exceeds the above upper limit, there is a case where the laminated body is difficult to tear. The upper limit of the tear strength is more preferably 0.35 N, even more preferably 0.3 N. The tear strength is satisfactorily 0.1 N.

(Straight Cuttability)

The upper limit of straight cuttability of the laminated body according to the present invention is preferably 3 mm, more preferably 2 mm, even more preferably 1 mm. If the straight cuttability exceeds the above upper limit, there is a case where a packaging body causes a phenomenon called "Nakiwakare". The straight cuttability is satisfactorily 1 mm.

(Shrinkage Ratio During Retorting)

The upper limit of shrinkage ratio during retorting of the laminated body according to the present invention is not particularly limited, but is 10%. If the shrinkage ratio during retorting exceeds the above upper limit, there is a case where the appearance of a packaging body after retorting is poor. The upper limit of the shrinkage ratio during retorting is more preferably 7%. The lower limit of the shrinkage ratio during retorting in the longitudinal direction is nor particularly limited, but is 5%. If the shrinkage ratio during retorting in the longitudinal direction is less than the above lower limit, there is a case where elongation after retorting is large, which may cause bag breaking. The lower limit of the shrinkage ratio during retorting in the longitudinal direction is more preferably −2%, even more preferably 0%.

(Heat-Seal Strength)

The lower limit of heat-seal strength of the laminated body according to the present invention before retorting is not particularly limited, but is preferably 35 N/15 mm, more preferably 10 N/15 mm. If the heat-sealing strength is less than the above lower limit, there is a case where bag-breaking resistance deteriorates. The heat-seal strength is preferably maintained at 35 N/15 mm or more even after retort treatment at 121° C. for 30 minutes. The upper limit of the heat-seal strength is not particularly limited, but is preferably 60 N/15 mm. In order to allow the heat-seal strength to exceed the above upper limit, for example, the thickness of the film needs to be increased, which may increase costs.

(Seal Energy)

The lower limit of seal energy of the laminated body according to the present invention is not particularly limited, but is preferably 0.9 J/150 mm$^2$, more preferably 1.0 J/150 mm$^2$, even more preferably 1.2 J/150 mm$^2$, if the seal energy is less than the above lower limit, there is a case where hag-breaking resistance deteriorates. The upper limit of seal energy of the laminated film is not particularly limited, but is preferably 1.6 J/150 mm$^2$, more preferably 1.4 J/150 mm$^2$. If the seal energy exceeds the above upper limit, for example, the thickness of the film needs to be increased, which may increase costs.

(Piercing Strength)

The lower limit of piercing strength of the laminated body according to the present invention before retorting is not particularly limited, but is preferably 8.0 N, more preferably 10.0 N, even more preferably 17 N. If the piercing strength is less than the above lower limit, there is a case where a pin hole is formed when a projection comes into contact with a packaging body. The upper limit of the piercing strength is not particularly limited, but is preferably 45.0 N, more preferably 30.0 N. If the piercing strength exceeds the above upper limit, there is a case where handling of the laminated body is difficult due to too high resilience.

(Packaging Body)

The laminated body provided to enclose a food product or the like as a content to protect the content from dirt or gas derived from nature is referred to as a packaging body. The packaging body is produced by, for example, cutting the laminated body and bonding inner surfaces of the laminated body to each other by a hot heat-seal bar or ultrasonic waves to form a bag. For example, a four-edge sealed bag is widely used which is produced by stacking rectangular two sheets of the laminated body in such a manner that their sealant-side surfaces face to each other and heat-sealing four edges. The content may be a food product, but may also be another product such as a daily product. The packaging body may be one having a shape other than a rectangular shape, such as a standing pouch or a pillow packaging body.

Further, a packaging body capable of withstanding heat of thermal sterilization using hot water at 100° C. or more obtained by pressurization for boiling point elevation is referred to as a packaging body for retort applications. A film intended to provide such a packaging body is referred to as a film for retort applications.

(Phenomenon Called "Nakiwakare")

The upper limit of a phenomenon called "Nakiwakare" of a four-edge sealed bag to which the present invention is applied is not particularly limited, but is preferably 5 mm, more preferably 4 mm, even more preferably 3 mm, particularly preferably 2 mm. If the phenomenon called "Nakiwakare" exceeds the above upper limit, there is a case where a content spills out of the packaging body when the packaging body is torn. The phenomenon called "Nakiwakare" is satisfactorily 1 mm.

(Bag-Breaking Resistance)

A four edge sealed bag formed from the laminated body according to the present invention is repeatedly dropped until the bag breaks to measure the number of times of dropping. The number of times of dropping when 50% of the bags remain without breaking is preferably 5 times or more, more preferably 10 times or more from a practical viewpoint. Evaluation was performed according to the following criteria.

⊚: The number of times of dropping to achieve a survival rate of 50% was 13 times or more.
◦: The number of times of dropping to achieve a survival rate of 50% was 10 times or more and 12 times or less.
Δ: The number of times of dropping to achieve a survival rate of 50% was 5 times or more and 9 times or less.
x: The number of times of dropping to achieve a survival rate of 50% was 1 times or less.

EXAMPLES

Hereinbelow, the present invention will be described in detail with reference to examples, but is not limited to these examples. The properties of products obtained in the examples were measured and evaluated by the following methods. In the evaluations, a longitudinal direction and a width direction in film production were defined as a MD direction and a TD direction, respectively.

(1) Resin Density

A density was evaluated in accordance with Method D of JIS K7112-1999 (density-gradient tube).

The measurement was performed at N=3, and an average value was calculated.

(2) Melt Flow Rate (MFR)

A melt flow rate was measured at 230° C. and a load of 2.16 kg on the basis of JIS K-7210-1. The measurement was performed at N=3, and an average value was calculated.

(3) Thermal Shrinkage Ratio

A film before lamination was cut to obtain a 120 mm square sample. Gauge lines were drawn at an interval of 100 mm in each of the MD direction (direction in which the film travels during production) and the TD direction (direction perpendicular to the MD direction). The sample was hung in an oven maintained at 120° C. for 30 minutes to be subjected to heat treatment. A distance between the gauge lines was measured, and a thermal shrinkage ratio was calculated by the following formula. The measurement was performed at N=3, and an average value was calculated.

Thermal shrinkage ratio=(gauge length before heat treatment−gauge length after heat treatment)/gauge length before heat treatment×100(%)

(4) Yield Stress

A film before lamination was cut to obtain a strip having a width of 15 mm. A tensile test was performed using a universal testing machine 5965 manufactured by Instron at a gauge length of 20 mm and a cross head speed of 1000 mm/mm. A tensile stress when the slope of a stress-strain curve first became 0 was defined as a yield stress. When a stretch ratio is high, a point where the slope is 0, which is generally called upper yield point, disappears. Also in such a case, a tensile stress when the slope first became 0 near a fracture point was defined as a yield stress. The measurement was performed at N=3 in each of the MD direction and the TD direction, and an average value was calculated for each direction.

(5) Tear Strength

A tear strength was measured in accordance with JIS K128-1:1998. Evaluation was performed on a base film before lamination and a laminated film. The measurement was performed at N=3 in each of the MD direction and the TD direction, and an average value was calculated.

(6) Straight Cuttability

Straight cuttability refers to the ability of a film or a laminated body to be torn straight in a longitudinal direction. Measurement was performed by the following method. In the examples, stretching was performed in the MD direction, and therefore the thermal shrinkage ratio was high in the MD direction, and the longitudinal direction was the MD direction. Therefore, straight cuttability was evaluated only in the MD direction.

A laminated film was cut to obtain a strip sample whose size in the MD direction was 150 mm and size in the TD direction was 60 mm. An incision of 30 mm was made in the center of the short-side edge of the sample along the MD direction. The sample was torn in accordance with JIS K7128-1:1998. The sample was torn 120 mm excluding 30 mm of the incision in the MD direction, and at this time, the distance of shift to the TD direction was measured and an absolute value thereof was recorded. The measurement was performed at N=3 in both cases where a section on the observer's right side was held by an upper holder and where a section on the observer's left side was held by an upper holder, and an average value was calculated in each of the cases. The larger one of the right-side measurement result and the left-side measurement result was used.

(7) Phenomenon Called "Nakiwakare"

Two sheets of a laminated film were heat-sealed in such a manner that their heat-seal film-side surfaces faced to each other to form a four-edge sealed bag whose inside dimension in the MD direction was 120 mm and inside dimension in the TD direction was 170 mm. A notch was made at the edge of the four-edge sealed bad, and the bag was torn with fingers in the MD direction. The bag was cut to the opposite edge, and a gap between the tear lines of the front-side film and the back-side film of the bag was measured. The measurement was performed at N=3 in each of directions in which the right hand side was the near side and in which the left-hand side was the near side, and an average value was calculated. The larger one of the measured values was used.

(8) Shrinkage Ratio During Retorting

A laminated film was cut to obtain a 120-mm square piece. Gauge lines were drawn at an interval of 100 mm in each of the MD direction and the TD direction. Retort treatment was performed with hot water at 121° C. for 30 minutes. A distance between the gauge lines was measured, and a shrinkage ratio during retorting was measured by the following formula. The measurement was performed at N=3 in each of the directions, and an average value was calculated.

Shrinkage ratio during retorting=(gauge length before treatment−gauge length after treatment)/gauge length before treatment×100(%)

(9) Heat-Seal Start Temperature

A heat-seal temperature is an item related to productivity at the time when continuous production using a bag-making machine is assumed. Excellent suitability for bag making means that satisfactory sealing performance can be achieved within a temperature range where shrinkage or breakage of a base film does not occur. Evaluation of heat-seal temperature was performed in the following manner.

In the above described measurement of heat-seal strength, heat-seal strength was measured while the temperature of a heat-seal bar was changed at a pitch of 5° C. The measurement was performed at N=3 at each heat-seal bar temperature. A weighted average of the heat-seal strength at a temperature just before exceeding 30 N and the heat-seal strength at a temperature just after exceeding 30 N was calculated.

(10) Finished Quality of Bag

Two sheets of a laminated film were stacked so that their polyolefin-based resin film-side surfaces faced to each other, and then heat-sealed at a pressure of 0.2 MPa and a heat-seal temperature of 220° C. for 1 second using a seal bar having a width of 10 mm to form a four-edge sealed bag whose inside dimension in the MI) direction was 120 mm and inside dimension in the TD direction was 170 mm. The final conditions of the four-edge sealed bag were visually observed.

○: The bag was perfectly rectangle without distortion near the heat-sealed portion.

Δ: There was a little distortion near the heat sealed portion.

x: There was a large distortion near the heat-sealed portion so that the edges of the bag were wavy.

(11) Heat-Seal Strength

Conditions for heat sealing and conditions for strength measurement are as follows. Two sheets of a laminated film obtained in Example or Comparative Example were stacked so that their polyolefin-based resin film-side surfaces faced to each other, heat-sealed at a pressure of 0.2 MPa and a heat-seal temperature of 220° C. for 1 second using a seal bar having a width of 10 mm, and allowed to stand to cool. Test pieces having a size in the MD direction of 80 mm and a size in the TD direction of 15 mm were cut out from each of the films heat-sealed at different temperatures, and the heat-sealed portion of each of the test pieces was subjected to peeling at a cross head speed of 200 mm/min to measure peel strength. As a test machine, a universal testing machine 5965 manufactured by Instron was used. The measurement was performed at N=3 at each heat seal temperature, and an average value was calculated. The measurement was performed before and after retort treatment performed using hot water at 121° C. for 30 minutes.

(12) Seal Energy

When the heat-seal strength of a laminated film before retorting was measured, seal energy was calculated by analyzing, using Instron's analysis soft ware blue hill 3, the area of a graph from the start of peeling to breakage in a measurement chart whose horizontal axis represents peeling distance and vertical axis represents peeling strength. The measurement was performed at N=3, and an average value was calculated.

(13) Bag-Breaking Resistance

Two sheets of a laminated film were cut out to form a four-edge sealed bag containing 300 ml of saturated saline and having inside dimensions of 170 ram (length) and 120 mm (width). At this time, heat sealing was performed for 1 second under conditions of a pressure of 0.2 MPa, a seal bar width of 10 mm, and a heat-seal temperature of 220° C. After the bag making, the edges of the four-edge sealed bag were trimmed so that a seal width was 5 mm. The four-edge sealed bag was subjected to retorting at 121° C. for 30 minutes. Then, the four-edge sealed bag was allowed to stand in an environment at −5° C. for 8 hours, and was dropped onto a flat concrete floor from a height of 1.0 mm such an environment. The four-edge sealed bag was repeatedly chopped until it broke to measure the number of times of repeated dropping. The following criteria were provided. The number of bags for each grade was 20.

⊚: The number of times of dropping to achieve a survival rate of 50% was 13 times or more.
○: The number of times of dropping to achieve a survival rate of 50% was 10 times or more and 12 times or less.
Δ: The number of times of dropping to achieve a survival rate of 50% was 5 times or more and 9 times or less.
x: The number of times of dropping to achieve a survival rate of 50% was 1 times or less.

(14) Piercing Strength

The piercing strength of a base film or a laminated film was measured at 23° C. in accordance with "2. Strength testing method" in "Chapter 3: Apparatuses, containers, and packaging in the Specifications and standards for foods, food additives, etc." (Public Notice of the Ministry of Health, Labour, and Welfare No. 20 of 1982) in Food Sanitation Act. A needle whose tip had a diameter of 0.7 mm pierced the film at a piercing speed of 50 mm/m in to measure strength when the needle passed through the film. The obtained measured value was divided by the thickness of the film to calculate piercing strength (N/μm) per micrometer of the film. The measurement was performed at N=3, and an average value was calculated.

The measurement was performed in the same manner also after the laminated film was subjected to retort treatment using hot water at 121° C. for 30 minutes.

(15) Orientation Angle

The orientation angle (°) of a base film was measured using a molecular orientation analyzer, MOA-6004 manufactured by Oji Scientific Instruments Co., Ltd. A sample whose size in the MD direction was 120 mm and size in the TD direction was 100 mm was cut out and set in the measuring instrument, and a measured value of angle was defined as an orientation angle. It is to be noted that the MD direction is 0°. The measurement was performed at N=3, and an average value was calculated.

Example 1

(Polyolefin-Based Resin Film)

94 parts by weight of a propylene ethylene block copolymer having a resin density of 891 kg/m$^3$ and a MFR of 3.0 g/10 min at 230° C. and 2.16 kg (WFS5293-22 manufactured by SUMITOMO CHEMICAL COMPANY, LIMITED, propylene content: 93.5% by weight) and 6 parts by weight of an ethylene-propylene copolymer elastomer resin having a resin density of 870 kg/m$^3$ and a MFR of 1.8 g/10 min at 230° C. and 2.16 kg (TAFMER P0480 manufactured by Mitsui Chemical, Inc., propylene content: 27% by weight) were mixed.

(Melt Extrusion)

A three stage-type single screw extruder having a screw diameter of 90 ram was used to introduce the mixed polyolefin-based resin into a T slot die having a two-stage preland with a width of 800 mm and designed so that a stepped portion was curved to allow a melted resin to flow uniformly therein, and the polyolefin based resin was extruded through the die at an outlet temperature of 230° C.

(Cooling)

A melted resin sheet extruded through the die was cooled by a cooling roll at 21° C. to obtain an unstretched polyolefin-based resin film having a thickness of 270 (μm). During the cooling using the cooling roll, air trapping between the melted resin sheet and the cooling roll was prevented by allowing air nozzles to fix both ends of the film on the cooling roll, allowing an air knife to press the melted resin sheet against the cooling roll over the entire width thereof, and at the same time operating a vacuum chamber. The air nozzles for fixing both edges of the film were provided in series in the machine direction of the film. The die was surrounded with a sheet to prevent the melted resin sheet from being exposed to wind.

(Pre-Heating)

The unstretched sheet was guided to heated rolls to pre heat the sheet by contact with the rolls. The temperature of the pre heating roils was set to 105° C. Both surfaces of the film were pre-heated using the rolls.

(Machine Direction Stretching)

The unstretched sheet was guided to a roll stretching machine and stretched 4.5 times in the MD direction using a speed difference between rolls to have a thickness of 60 μm. The temperature of the stretching rolls was set to 105° C.

(Annealing Treatment)

Heat treatment was performed at 120° C. using annealing rolls. Both surfaces of the film were subjected to heat treatment using the rolls.

(Corona Treatment)

One surface (lamination surface) of the film was subjected to corona treatment.

(Winding)

The film was produced at a speed of 20 m/min. The edges of the produced film were trimmed and wound into a roll.

(Production of Laminated Film)

A polyolefin-based resin film obtained in Example or Comparative Example was dry-laminated on a base film (biaxially-stretched nylon film manufactured by TOYOBO CO., LTD., N1102, thickness: 15 µm, orientation angle: 22° with respect to the MD direction) using an ester-based adhesive obtained by mixing 33.6 parts by mass of an ester-based adhesive for dry lamination (TM569 manufactured by Toyo-Morton, Ltd.), 1.0 parts by mass of a curing agent (CAT10L manufactured by Toyo-Morton, Ltd.), and 62.4 parts by mass of ethyl acetate so that the amount of the adhesive applied was 3.0 g/m$^2$). A laminated film obtained by lamination was maintained at 40° C. for 3 days to perform aging. In this way, a laminated film was obtained.

Example 2

A polyolefin-based resin film was obtained in the same manner as in Example 1 except that the mixing ratio between the propylene-ethylene block copolymer (WFS5293-22 manufactured by SUMITOMO CHEMICAL COMPANY, LIMITED) and the ethylene propylene copolymer elastomer (TAFMER P0480 manufactured by Mitsui Chemical. Inc.) was changed to 96 parts by weight (propylene-ethylene block copolymer): 4 parts by weight (ethylene-propylene copolymer elastomer (TAFMER P0480 manufactured by Mitsui Chemical, Inc.)).

Example 3

A polyolefin-bawd resin film was obtained in the same manner as in Example 1 except that the mixing ratio between the propylene-ethylene block copolymer (WFS529322 manufactured by SUMITOMO CHEMICAL COMPANY, LIMITED) and the ethylene-propylene copolymer elastomer (TAFMER P0480 manufactured by Mitsui Chemical, Inc.) was changed to 90 parts by weight: 10 parts by weight.

Example 4

A polyolefin-based resin film was obtained in the same manner as in Example 1 except that the stretch ratio in the MD direction was changed to 5.0 times by changing the speed of the cooling roll in casting without changing the speed of the stretching rolls. This method makes it possible to obtain a polyolefin-based resin film having the same film thickness after stretching without changing the discharge amount.

Example 5

A polyolefin-based resin film was obtained in the same manner as in Example 1 except that the temperature of the annealing rolls was set to 90° C.

Example 6

A polyolefin-based resin film was obtained in the same manner as in Example 1 except that the film thickness was changed to 50 µm by reducing the rotation speed of the extruder and the discharge amount during film formation.

Example 7

A polyolefin-based resin film was obtained in the same manner as in Example 1 except that the temperature of the pre-heating rolls was set to 90° C.

Example 8

A polyolefin based resin film was obtained in the same manner as in Example 1 except that the resin mixing ratio was changed so that the ratio among the propylene-ethylene block copolymer, the ethylene-propylene copolymer elastomer (TAFMER P0480 manufactured by Mitsui Chemical, Inc.), and a propylene-ethylene random copolymer (Si 31 manufactured by SUMITOMO CHEMICAL COMPANY, LIMITED) having a density of 890 kg/m$^3$, a MFR of 1.5 g/10 min (as measured at 230° C. and 2.16 kg), and a melting point of 132° C. was 64 parts by weight: 6 parts by weight: 30 parts by weight. The ratio of the propylene-α olefin random copolymer to the total amount of the propylene-ethylene block copolymer and the propylene-α olefin random copolymer was 32% by weight.

Example 9

A polyolefin-based resin film was obtained in the same manner as in Example 8 except that the temperature of the annealing rolls was set to 130° C. The ratio of the propylene-α olefin random copolymer to the total amount of the propylene-ethylene block copolymer and the propylene-α olefin random copolymer was 32% by weight.

Example 10

A polyolefin-based resin film was obtained in the same manner as in Example 9 except that the stretch ratio in the MD direction was changed to 4.0 times. The ratio of the propylene-α olefin random copolymer to the total amount of the propylene-ethylene block copolymer and the propylene-α olefin random copolymer was 32% by weight.

Example 11

A polyolefin-based resin film was obtained in the same manner as in Example 1 except that the resin mixing ratio was changed so that the ratio among the propyl one-ethylene block copolymer (WFS5293-22 manufactured by SUMITOMO CHEMICAL COMPANY, LIMITED), the ethylene-propylene copolymer elastomer, and a propylene-ethylene random copolymer (S131 manufactured by SUMITOMO CHEMICAL COMPANY, LIMITED) was 81 parts by weight: 6 parts by weight: 10 parts by weight. The ratio of the propylene-α olefin random copolymer to the total amount of the propylene-ethylene block copolymer and the propylene-α olefin random copolymer was 11% by weight.

Example 12

A polyolefin-based resin film was obtained in the same manner as in Example 1 except that the resin mixing ratio was changed so that the ratio among the propylene ethylene block copolymer (WFS5293-22 manufactured by SUMITOMO CHEMICAL COMPANY, LIMITED), the ethylene-propylene copolymer elastomer (TAFMER P0480 manufactured by Mitsui Chemical, Inc.), and a propylene-ethylene random copolymer (S131 manufactured by SUMITOMO CHEMICAL COMPANY, LIMITED) was 74 parts by weight: 6 parts by weight: 20 parts by weight. The ratio of the propylene-α olefin random copolymer to the total amount of the propylene-ethylene block copolymer and the propylene-α olefin random copolymer was 21% by weight.

Comparative Example 1

A polyolefin-based resin film was obtained in the same manner as in Example 1 except that the stretch ratio in the MD direction was changed to 1.0 times (unstretched) by changing the speed of the cooling roll in casting without changing the speed of the stretching rolls and that the annealing treatment was omitted.

Comparative Example 2

A polyolefin-based resin film was obtained in the same manner as in Example 1 except that the stretch ratio in the MD direction was changed to 2.0 times.

Comparative Example 3

A polyolefin-based resin film was obtained in the same manner as in Example 1 except that the stretch ratio in the MD direction was changed to 3.1 times.

Comparative Example 4

A polyolefin-based resin film was obtained in the same manner as in Example 1 except that the stretch ratio in the MD direction was changed to 6.0 times.

Comparative Example 5

A polyolefin-based resin film was obtained in the same manner as in Example 1 except that the annealing treatment was omitted.

Comparative Example 6

A polyolefin-based resin film was obtained in the same manner as in Example 8 except that the annealing treatment was omitted. The ratio of the propylene-α olefin random copolymer to the total amount of the propylene ethylene block copolymer and the propylene-α olefin random copolymer was 32% by weight.

Comparative Example 7

A polyolefin-based resin film was obtained in the same manner as in Example 1 except that the mixing ratio among resins used was changed so that the ratio among the propylene-ethylene block copolymer (WFS5293-22), a propylene-butene copolymer elastomer (TAFMER XM7070 manufactured by Mitsui Chemical, Inc.) having a resin density of 900 kg/m$^3$ and a MFR of 6.7 g/10 rain (as measured at 230° C. and 2.16 kg) was 90 parts by weight: 10 parts by weight.

Comparative Example 8

A polyolefin-based resin film was obtained in the same manner as in Example 1 except that the mixing ratio among resins used was changed so that the ratio among the propylene-ethylene block copolymer (WFS5293-22), the propylene-butene copolymer elastomer (TAFMER XM7070 manufactured by Mitsui Chemical, Inc.) having a resin density of 900 kg/m$^3$ and a MFR of 6.7 g/10 min (as measured at 230° C. and 2.16 kg), and an ethylene-butene copolymer elastomer (TAFMER A1085S manufactured by Mitsui Chemical, Inc.) having a resin density of 885 kg/m$^3$ and a MFR of 1.8 g/10 min (as measured at 230° C. and 2.16 kg) was 92 parts by weight: 4 parts by weight: 4 parts by weight.

Comparative Example 9

A polyolefin-based resin film was obtained in the same manner as in Example 8 except that the resin mixing ratio was changed so that the ratio between the propylene-ethylene block copolymer (WFS5293-22 manufactured by SUMITOMO CHEMICAL COMPANY, LIMITED) and the propylene-ethylene random copolymer (S131 manufactured by SUMITOMO CHEMICAL COMPANY, LIMITED) was 70 parts by weight: 30 parts by weight. The ratio of the propylene-α olefin random copolymer to the total amount of the propylene ethylene block copolymer and the propylene-α olefin random copolymer was 30% by weight.

Comparative Example 10

A polyolefin-based resin film was obtained in the same manner as in Example 8 except that the resin mixing ratio was changed so that the ratio between the propylene-ethylene random copolymer (S131 manufactured by SUMITOMO CHEMICAL COMPANY, LIMITED) and the ethylene-propylene copolymer elastomer (TAFMER P0480 manufactured by Mitsi Chemical Inc.) was 94 parts by weight: 6 parts by weight and that the temperature of the annealing rolls was set to 110° C.

Comparative Example 11

A polyolefin-based resin film was obtained in the same manner as in Example 10 except that the resin mixing ratio was changed so that the ratio among the propylene-ethylene block copolymer (WFS5293-22 manufactured by SUMITOMO CHEMICAL COMPANY, LIMITED), the ethylene-propylene copolymer elastomer (TAFMER P0480 manufactured by Mitsui Chemical, Inc.), and the propylene-ethylene random copolymer (S131 manufactured by SUMITOMO CHEMICAL COMPANY, LIMITED) was 20 parts by weight: 6 parts by weight: 74 parts by weight. The ratio of the propylene α-olefin random copolymer to the total amount of the propylene-ethylene block copolymer and the propylene-α olefin random copolymer was 74% by weight.

In Comparative Examples 1 to 3, straight cuttability was poor due to a low stretch ratio.

In Comparative Example 4, bag-breaking resistance was poor due to a high stretch ratio.

In Comparative Examples 5 and 6, finished quality was poor clue to an increase in shrinkage ratio during retorting caused by omission of annealing treatment.

In Comparative Examples 7 and 8, finished quality and bag-breaking resistance were poor due to the use of the ethylene-butene copolymer elastomer.

In Comparative Example 9, bag-breaking resistance was poor because no ethylene-propylene copolymer elastomer was used.

In Comparative Examples 10 and 11, bag-breaking resistance was poor and the phenomenon called "Nakiwakare" was likely to occur because the amount of the ethylene-propylene block copolymer was small and the amount of the propylene-ethylene random copolymer was large.

The results are shown in Tables 1 and 2.

TABLE 1

| | | Unit | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|---|
| Mixing ratio between/among raw materials of resin composition (parts by weight) Pr: propylene Et: ethylene Bu: butene | Pr-Et block copolymer Ratio | — parts by weight | Pr-Et block WFS5293-22 94 | Pr-Et block WFS5293-22 96 | Pr-Et block WFS5293-22 90 | Pr-Et block WFS5293-22 94 | Pr-Et block WFS5293-22 94 | Pr-Et block WFS5293-22 94 | Pr-Et block WFS5293-22 94 | Pr-Et block WFS5293-22 64 | Pr-Et block WFS5293-22 64 | Pr-Et block WFS5293-22 64 | Pr-Et block WFS5293-22 64 | Pr-Et block WFS5293-22 74 |
| | Pr-α olefin random copolymer Ratio | — parts by weight | — | — | — | — | — | — | — | Pr-Et random S131 30 | Pr-Et random S131 30 | Pr-Et random S131 30 | Pr-Et random S131 10 | Pr-Et random S131 20 |
| | Copolymer elastomer Ratio | — parts by weight | Et-Pr P0480 8 | Et-Pr P0480 4 | Et-Pr P0480 10 | Et-Pr P0480 6 | Et-Pr P0480 6 | Et-Pr P0480 6 | Et-Pr P0480 6 | Et-Pr P0480 6 | Et-Pr P0480 6 | Et-Pr P0480 6 | Et-Pr P0480 6 | Et-Pr P0480 6 |
| | Copolymer elastomer Ratio | — parts by weight | — | — | — | — | — | — | — | — | — | — | — | — |
| Ratio of Pr-α olefin random copolymer to total of Pr-Et block copolymer and Pr-α olefin random copolymer | | % by weight | 0 | 0 | 0 | 0 | 0 | 0 | 0 | 32 | 32 | 32 | 11 | 21 |
| Pre-heating temperature | | °C | 105 | 105 | 105 | 105 | 105 | 105 | 90 | 105 | 105 | 105 | 105 | 105 |
| Stretch temperature | | °C | 105 | 105 | 105 | 105 | 105 | 105 | 105 | 105 | 105 | 105 | 105 | 105 |
| Stretch ratio | | times | 4.5 | 4.5 | 4.5 | 5.0 | 4.5 | 4.5 | 4.5 | 4.5 | 4.5 | 4.0 | 4.5 | 4.5 |
| Annealing treatment | | °C | 120 | 120 | 120 | 120 | 90 | 120 | 120 | 120 | 130 | 130 | 120 | 120 |
| Thickness | | μm | 60 | 60 | 60 | 60 | 60 | 50 | 60 | 60 | 60 | 60 | 60 | 60 |

TABLE 1-continued

| | | Unit | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|---|
| Thermal shrinkage ratio | MD/TD | % | 13.8/0.5 | 13.5/0.3 | 19.0/0.1 | 11.5/0.2 | 19.6/0.3 | 13.7/0.3 | 5.0/0.1 | 15.0/0.1 | 11.3/0.2 | 10.3/0.2 | 14.2/0.2 | 14.5/0.2 |
| Yield stress | MD | MPa | 170 | 176 | 174 | 236 | 169 | 170 | 172 | 171 | 172 | 161 | 178 | 174 |
| Yield stress | TD | MPa | 22 | 21 | 22 | 23 | 21 | 21 | 21 | 23 | 22 | 22 | 22 | 22 |
| Yield stress ratio | MD/TD | — | 7.7 | 6.4 | 7.9 | 10.3 | 8.0 | 8.1 | 6.2 | 7.4 | 7.6 | 7.3 | 8.1 | 7.9 |
| Tear strength | MD | N | 0.10 | 0.09 | 0.15 | 0.05 | 0.13 | 0.08 | 0.10 | 0.21 | 0.15 | 0.14 | 0.15 | 0.16 |
| Tear strength | TD | N | unmeasur-able* | unmeasur-able* | unmeasur-able* | unmeasur-able* | unmeasur-able* | unmeasur-able* | unmeasur-able* | 3.2 | 3.0 | 3.3 | unmeasur-able* | 2.8 |
| Tear strength* | MD | N | 0.10 | 0.10 | 0.18 | 0.08 | 0.18 | 0.15 | 0.10 | 0.32 | 0.27 | 0.28 | 0.18 | 0.28 |
| Tear strength* | TD | N | unmeasur-able* | unmeasur-able* | unmeasur-able* | unmeasur-able* | unmeasur-able* | unmeasur-able* | unmeasur-able* | unmeasur-able* | unmeasur-able* | unmeasur-able* | unmeasur-able* | unmeasur-able* |
| Straight cuttability* | MD | mm | 1 | 1 | 1 | 0 | 1 | 1 | 1 | 1 | 1 | 1 | 1 | 1 |
| Phenomenon called "Nakiwakare"* | MD | mm | 3 | 3 | 3 | 1 | 3 | 1 | 3 | 3 | 3 | 3 | 3 | 3 |
| Shrinkage ratio during retorting* | MD/TD | % | 5.8/2.0 | 5.7/2.0 | 6.3/1.1 | 5.0/1.2 | 9.8/1.0 | 5.7/1.8 | 2.6/1.2 | 6.3/1.1 | 4.6/1.1 | 4.0/1.0 | 5.9/1.2 | 6.2/1.3 |
| Seal start temperature* | MD | °C. | 192 | 193 | 192 | 198 | 192 | 193 | 192 | 174 | 180 | 179 | 182 | 177 |
| Finish quality of bag* | — | — | ○ | ○ | ○ | ○ | △ | ○ | ○ | ○ | ○ | ○ | ○ | ○ |
| Heat-seal strength* | MD | N/15 mm | 41 | 42 | 38 | 37 | 42 | 38 | 41 | 43 | 44 | 43 | 44 | 44 |
| Seal energy* | MD | J/150 mm² | 0.9 | 0.9 | 0.9 | 0.9 | 0.9 | 0.9 | 0.9 | 1.2 | 0.9 | 1.0 | 0.9 | 0.9 |
| Heat-seal strength* | MD after retorting | N/15 mm | 36 | 36 | 36 | 35 | 41 | 36 | 36 | 41 | 41 | 42 | 36 | 36 |
| Bag-breaking strength* | — | — | ○ | ○ | ○ | ○ | ○ | ○ | ○ | ◎ | ◎ | ◎ | ○ | ○ |
| Piercing strength | Film before lamination | N/μm | 0.18 | 0.17 | 0.19 | 0.18 | 0.18 | 0.17 | 0.18 | 0.17 | 0.18 | 0.17 | 0.18 | 0.18 |
| Piercing strength* | Before retorting | N | 23.1 | 23.3 | 23.9 | 23.5 | 22.9 | 22.6 | 23.0 | 21.8 | 21.9 | 21.6 | 23.0 | 23.1 |
| Piercing strength* | After retorting | N | 12.9 | 13.0 | 13.4 | 13.1 | 12.6 | 12.8 | 13.1 | 12.3 | 12.4 | 12.2 | 10.6 | 10.1 |

TABLE 2

| | Unit | Comparative example 1 | Comparative example 2 | Comparative example 3 | Comparative example 4 | Comparative example 5 | Comparative example 6 | Comparative example 7 | Comparative example 8 | Comparative example 9 | Comparative example 10 | Additional comparative example 11 |
|---|---|---|---|---|---|---|---|---|---|---|---|---|
| Mixing ratio between/among raw materials of resin composition (parts by weight) Pr: propylene Et: ethylene Bu: butene | Pr-Et block copolymer TD | Pr-Et block WFS5293-22 | Pr-Et block WFS5293-22 | Pr-Et block WFS5293-22 | Pr-Et block WFS5293-22 | Pr-Et block WFS5293-22 | Pr-Et block WFS5293-22 | Pr-Et block WFS5293-22 | Pr-Et block WFS5293-22 | Pr-Et block WFS5293-22 | — | Pr-Et block WFS5293-22 |
| | parts by weight | 94 | 94 | 94 | 94 | 94 | 64 | 90 | 92 | 70 | — | 20 |
| | Pr-α olefin random copolymer | — | — | — | — | — | Pr-Et random S131 | — | — | Pr-Et random S131 | Pr-Et random S131 | Pr-Et random S131 |
| | parts by weight | — | — | — | — | — | 30 | — | — | 30 | 94 | 74 |
| | Copolymer elastomer Ratio | Et-Pr P0480 | Et-Pr P0480 | Et-Pr P0480 | Et-Pr P0480 | Et-Pr P0480 | Et-Pr P0480 | Pr-Bu XM7070 | Pr-Bu XM7070 | — | Et-Pr P0480 | Et-Pr P0480 |
| | parts by weight | 6 | 6 | 6 | 6 | 6 | 6 | 10 | 4 | — | 6 | 6 |
| | Copolymer elastomer Ratio | — | — | — | — | — | — | — | Et-Bu A1085S | — | — | — |
| | parts by weight | — | — | — | — | — | — | — | 4 | — | — | — |
| Ratio of Pr-α olefin random copolymer to total of Pr-Et block copolymer and Pr-α olefin random copolymer | % by weight | 0 | 0 | 0 | 0 | 0 | 32 | 0 | 0 | 30 | 100 | 74 |
| Pre-heating temperature | °C. | 105 | 105 | 105 | 105 | 105 | 105 | 105 | 105 | 105 | 105 | 105 |
| Stretch temperature | °C. | 105 | 105 | 105 | 105 | 105 | 105 | 105 | 105 | 105 | 105 | 105 |
| Stretch ratio | times | 1.0 | 2.0 | 3.1 | 6.0 | 4.5 | 4.5 | 4.5 | 4.5 | 4.5 | 4.5 | 4.5 |
| Annealing treatment | °C. | not annealing | 120 | 120 | 120 | not annealing | not annealing | 120 | 120 | 130 | 110 | 110 |
| Thickness | μm | 60 | 60 | 60 | 60 | 60 | 60 | 60 | 60 | 60 | 60 | 60 |

TABLE 2-continued

| | | Unit | Comparative example 1 | Comparative example 2 | Comparative example 3 | Comparative example 4 | Comparative example 5 | Comparative example 6 | Comparative example 7 | Comparative example 8 | Comparative example 9 | Comparative example 10 | Additional comparative example 11 |
|---|---|---|---|---|---|---|---|---|---|---|---|---|---|
| Thermal shrinkage ratio | MD/TD | % | 0.2/0.6 | 6.6/0.8 | 14.9/0.2 | 10.3/0.1 | 25.3/1.9 | 26.6/2.1 | 19.5/0.6 | 19.5/0.5 | 12.2/0.2 | 18.6/0.3 | 18.0/0.1 |
| Yield stress | MD | MPa | 20 | 63 | 117 | 290 | 168 | 169 | 168 | 172 | 183 | 188 | 208 |
| Yield stress | TD | MPa | 17 | 21 | 22 | 20 | 18 | 22 | 23 | 22 | 24 | 25 | 32 |
| Yield stress ratio | MD/TD | — | 1.2 | 3.0 | 5.3 | 14.5 | 9.3 | 7.7 | 7.3 | 7.8 | 7.6 | 7.5 | 6.5 |
| Tear strength | MD | N | 3.20 | 0.36 | 0.24 | 0.06 | 0.16 | 0.44 | 0.14 | 0.13 | 0.15 | 0.30 | 0.14 |
| Tear strength | TD | N | 7.3 | 6.2 | unmeasur-able* | unmeasur-able* | unmeasur-able* | unmeasur-able* | unmeasur-able* | unmeasur-able* | 2.9 | unmeasur-able* | unmeasur-able* |
| Tear strength* | MD | N | 1.50 | 0.66 | 0.19 | 0.15 | 0.24 | 0.71 | 0.19 | 0.16 | 0.29 | 0.71 | 0.35 |
| Tear strength* | TD | N | 8.57 | 6.16 | unmeasur-able* | unmeasur-able* | unmeasur-able* | unmeasur-able* | unmeasur-able* | unmeasur-able* | unmeasur-able* | unmeasur-able* | unmeasur-able* |
| Straight cuttability* | MD | mm | 30 or more | 10 | 4 | 0 | 1 | 1 | 2 | 2 | 1 | 6 | 4 |
| Phenomenon called "Nakiwakare" | MD | mm | 30 or more | 28 | 6 | 1 | 4 | 4 | 4 | 3 | 3 | 9 | 6 |
| Shrinkage ratio during retorting* | MD/TD | % | 3.5/5.8 | 3.2/1.6 | 6.3/2.2 | 4.4/1.0 | 11.2/1.1 | 14.3/2.1 | 7.6/1.3 | 6.7/1.2 | 4.8/1.2 | 10.4/1.8 | 9.6/1.4 |
| Seal start temperature* | MD | °C. | 166 | 171 | 174 | 198 | 193 | 174 | 192 | 193 | 173 | 165 | 172 |
| Finish quality of bag* | | — | ◎ | ○ | ○ | ○ | X | X | △ | △ | ○ | ○ | ○ |
| Heat-seal strength* | MD | N/15 mm | 45 | 44 | 44 | 33 | 44 | 43 | 51 | 50 | 49 | 42 | 43 |
| Seal energy* | MD | J/150 mm² | 1.4 | 1.1 | 1.2 | 0.7 | 0.9 | 1.2 | 0.7 | 0.7 | 1.2 | 0.4 | 0.4 |
| Heat-seal strength* | MD after retorting | N/15 mm | 35.3 | 40 | 40 | 28 | 40 | 42 | 44 | 46 | 45 | 36 | 37 |
| Bag-breaking strength* | | mm | ◎ | ○ | ○ | X | ○ | ◎ | △ | △ | X | X | △ |
| Piercing strength | Film before lamination | N/μm | 0.06 | 0.11 | 0.15 | 0.17 | 0.17 | 0.18 | 0.19 | 0.16 | 0.19 | 0.17 | 0.17 |
| Piercing strength* | Before retorting | N | 13.7 | 16.9 | 19.5 | 25.0 | 22.8 | 23.8 | 24.1 | 23.8 | 21.5 | 25.6 | 23.4 |
| Piercing strength* | After retorting | N | 7.7 | 9.4 | 10.6 | 14.1 | 12.6 | 13.0 | 11.8 | 11.6 | 11.6 | 10.1 | 10.8 |

In Tables 1 and 2 showing the evaluation results, "unmeasurable*" means that the film was torn in the MD direction during property evaluation so that a measured value was not obtained.

INDUSTRIAL APPLICABILITY

According to the present invention, it is possible to provide a retort pouch that is straight cuttable with slight occurrence of a phenomenon called "Nakiwakare" in a cutting direction and that is less likely to break even in a low-temperature environment. Therefore, the present invention can significantly contribute to industry.

The invention claimed is:

1. A polyolefin-based resin film comprising:
(a) 90 to 97 parts by weight of a polyolefin-based resin comprising 60 to 100% by weight of a propylene-ethylene block copolymer and 0 to 40% by weight of a propylene-α olefin random copolymer based on a total amount of the propylene-ethylene block copolymer and the propylene-α olefin random copolymer, and
(b) 3 to 10 parts by weight of an ethylene-propylene copolymer elastomer,
wherein the polyolefin-based resin film has a thermal shrinkage in a longitudinal direction at 120° C. of 3% or more and 20% or less, a thermal shrinkage in a width direction at 120° C. of 1% or less, and a yield stress in the longitudinal direction of 150 MPa or more and 250 MPa or less, and
wherein the polyolefin-based resin film is a single layer, and (i) a tear strength of the polyolefin-based resin film in the longitudinal direction is not more than 0.16 N and (ii) a tear strength of the polyolefin-based resin film in the width direction is not less than 2.8 N or the polyolefin-based resin film is torn in the longitudinal direction during evaluation of tear strength in the width direction, wherein the tear strength is measured in accordance with JIS K7128-1:1998.

2. A laminated body comprising:
the polyolefin-based resin film according to claim 1; and
at least one film selected from the group consisting of a polyamide resin film, a polyester resin film, and a polypropylene resin film.

3. The laminated body according to claim 2, which has a straight cuttability of 5 mm or less, wherein straight cuttability is measured by providing a strip sample by cutting the laminated body to be 150 mm in the longitudinal direction and 60 mm in the width direction, making an incision of 30 mm in the center of the short-side edge of the strip sample along the longitudinal direction, tearing the strip sample in accordance with JIS K7128-1:1998 by tearing the sample strip 120 mm excluding 30 mm of the incision in the longitudinal direction, and measuring the absolute value of the distance of shift to the width direction.

4. A packaging body comprising the laminated body according to claim 3.

5. A packaging body comprising the laminated body according to claim 2.

6. A polyolefin-based resin film comprising two or more layers, wherein a surface of the polyolefin-based resin film is a sealing layer, and wherein the sealing layer comprises
(a) 90 to 97 parts by weight of a polyolefin-based resin comprising 60 to 100% by weight of a propylene-ethylene block copolymer and 0 to 40% by weight of a propylene-α olefin random copolymer based on a total amount of the propylene-ethylene block copolymer and the propylene-α olefin random copolymer, and
(b) 3 to 10 parts by weight of an ethylene-propylene copolymer elastomer,
wherein the polyolefin-based resin film has a thermal shrinkage in a longitudinal direction at 120° C. of 3% or more and 20% or less, a thermal shrinkage in a width direction at 120° C. of 1% or less, and a yield stress in the longitudinal direction of 150 MPa or more and 250 MPa or less, and
wherein (i) a tear strength of the polyolefin-based resin film in the longitudinal direction is not more than 0.16 N and (ii) a tear strength of the polyolefin-based resin film in the width direction is not less than 2.8 N or the polyolefin-based resin film is torn in the longitudinal direction during evaluation of tear strength in the width direction, wherein the tear strength is measured in accordance with JIS K7128-1:1998.

7. A laminated body comprising:
the polyolefin-based resin film according to claim 6; and
at least one film selected from the group consisting of a polyamide resin film, a polyester resin film, and a polypropylene resin film.

8. The laminated body according to claim 7, which has a straight cuttability of 5 mm or less, wherein straight cuttability is measured by providing a strip sample by cutting the laminated body to be 150 mm in the longitudinal direction and 60 mm in the width direction, making an incision of 30 mm in the center of the short-side edge of the strip sample along the longitudinal direction, tearing the strip sample in accordance with JIS K7128-1:1998 by tearing the sample strip 120 mm excluding 30 mm of the incision in the longitudinal direction, and measuring the absolute value of the distance of shift to the width direction.

9. A packaging body comprising the laminated body according to claim 8.

10. A packaging body comprising the laminated body according to claim 7.

* * * * *